(12) United States Patent
Basarab

(10) Patent No.: US 6,423,786 B1
(45) Date of Patent: Jul. 23, 2002

(54) ALKYLHYDRAZINE FUNCTIONALIZED RESIN

(75) Inventor: Gregory Steven Basarab, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/411,512

(22) Filed: Oct. 4, 1999

Related U.S. Application Data
(60) Provisional application No. 60/104,336, filed on Oct. 15, 1998.

(51) Int. Cl.$^7$ ............................................. C08F 212/08
(52) U.S. Cl. ................. 525/333.3; 525/328.4; 525/328.2; 525/333.6; 525/343; 525/374; 525/376; 525/378; 525/384
(58) Field of Search ................... 528/328.4, 333.3, 528/328.2, 333.6, 343, 374, 376, 378, 384

(56) References Cited

U.S. PATENT DOCUMENTS

| | | | |
|---|---|---|---|
| 4,873,171 A | 10/1989 | George et al. | 430/213 |
| 5,478,893 A | 12/1995 | Ghosh | 525/329.4 |

FOREIGN PATENT DOCUMENTS

| | | | |
|---|---|---|---|
| EP | 104074 A2 | 3/1984 | G03G/7/00 |

OTHER PUBLICATIONS

Rapp Polymere Gmbh, *Pricelist / Orderlist*, 1997, 24.
S.–H. L. Chiu, L. Anderson, "Oligosaccharide Synthesis . . . ", *Carbohydrate Research* 1976, 50, 227–238.
J. M. J. Fréchet et al., "Application of Phase–Transfer Catalysis . . . ", *J. Org. Chem.* 1979, 44, 1774–1778.
Th. J. Nieustad et al., "Reversible binding of sulfur dioxide . . . ", *Rec. trav. chim.* 1976, 95, 225–231.
S. Kobayashi et al., "Polymer–Supported . . . ", *Tetrahedron Lett.* 1996, 37, 2809–2812.
J. M J. Fréchet et al., "Functionalization of crosslinked . . . ", *Polymer* 1979, 20, 675–680.
C. R. Moore et al., "Proteolytic fragments . . . ", *Biochemistry*, 1989, 28, 9184–9191.
B. A. Burdick et al., "Polymeric thiols as enzyme activators . . . ", *Appl. Biochem. Biotechnol.*, 1987, 16, 145–156.
L. M. Gayo and M. J. Suto, "Traceless Linker . . . ", *Tetrahedron Lett.*, 1997, 38, 211–214.
J. Cerny and O. Wichterle, "Polythiouroniumverbingungen", *J. Polymer Sci.* 1958, 30, 501.
R. J. Booth and J. C. Hodges, "Polymer–Supported Quenching . . . ", *J. Am. Chem. Soc.* 1997, 119, 4882–4886.
M. W. Criswell et al., "Combinatorial Synthesis . . . ", *Tetrahedron* 1998, 54, 3983–3998.
J. R. Booth and J. C. Hodges, "Solid–Supported Reagent . . . ", *Acc. Shem. Res.* 1999, 32, 18–26.
S. W. Kaldor et al., "Use of Solid–Supported Nucleophiles . . . ", *Tetrahedron Lett.*, 1996, 37, 7193–7196.

*Primary Examiner*—Samuel Barts

(57) ABSTRACT

Disclosed are polymers comprising alkylhydrazine-functionalized styrene units of Formula 1

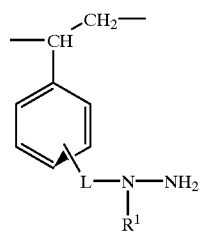

1 wherein

L is $L^1$ or $L^2$;

$L^1$ is $-(CH_2)_{\overline{m}}-(OCH_2CH_2)_{\overline{n}}-$;

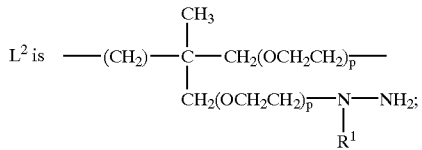

m is an integer from 1 to 3;
n is an integer from 0 to 50;
p is an integer from 1 to 25; and
$R_1$ is $C_1$–$C_3$ alky or benzyl;

a process for their preparation, and their use as supports for solid phase synthesis of small molecules and as supported nucleophiles to aid solution phase synthesis.

17 Claims, No Drawings

ALKYLHYDRAZINE FUNCTIONALIZED RESIN

This application claims the priority benefit of U.S. Provisional Application 60/104,336, filed Oct. 15, 1998.

FIELD OF THE INVENTION

This invention relates to novel solid phase reagents useful as solid phase supports for small molecule synthesis, and as supported nucleophiles to aid purification of solution phase reactions.

BACKGROUND OF THE INVENTION

The advent of combinatorial chemistry has sparked renewed interest in the use of functionalized polymers in the synthesis of small, organic molecules (for recent reviews, see Blackburn et al. "Functionalized Resins and Linkers for Solid-Phase Synthesis of Small Molecules", *Drugs of the Future* 1997, 22(9), 1007–1025; and Shuttleworth et al., "Functionalized Polymers: Recent Developments and New Applications in Synthetic Organic Chemistry", *Synthesis* 1997, 1217–1239). Inexpensive, readily prepared functionalized resins suitable for organic synthesis applications are increasingly needed.

U.S. Pat. No. 4,873,171 and EP-104,074-A2 disclose polymers prepared by quaternization of polyvinylbenzyl chloride with a disubstituted asymmetric hydrazine such as 1,1-dimethylhydrazine. While these references disclose quaternized polymers containing units such as

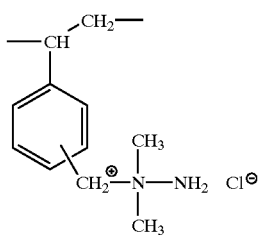

i are useful as polymeric mordants in photographic receiving layers and as electrically conductive polymers in plain paper electrostatic copiers, they do not suggest any application in small molecule synthesis. As the electronic-withdrawing inductive effect of the adjacent quaternized nitrogen would be expected to greatly diminish the useful nucleophilicity of the amino group, other polymers are required to address the needs of the synthetic organic chemist.

SUMMARY OF THE INVENTION

This invention pertains to a polymer comprising alkylhydrazine-functionalized styrene units of Formula 1

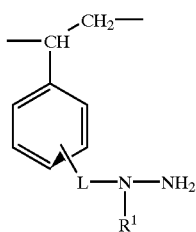

1 wherein

L is $L^1$ or $L^2$;

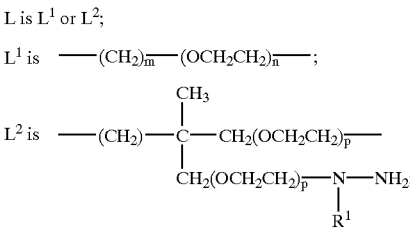

m is an integer from 1 to 3;
n is an integer from 0 to 50;
p is an integer from 1 to 25; and
$R^1$ is $C_1$–$C_3$ alkyl or benzyl.

Said polymer is optionally grafted onto other polymers, such as polyethylene.

This invention also relates to a bead comprising a polymer comprising units of Formula 1.

Another aspect of this invention pertains to a process for preparing a polymer comprising alkylhydrazine-functionalized styrene units of Formula 1, the process comprising the steps of:

(a) treating a polymer comprising functionalized styrene units of Formula 2

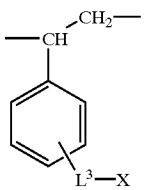

2 wherein $L^3$ is 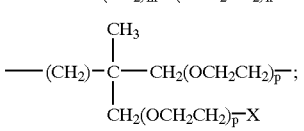

m is an integer from 1 to 3;
n is an integer from 0 to 50;
p is an integer from 1 to 25; and
X is a leaving group;

with a solvent suitable to swell said polymer; and (b) reacting the solvent-treated polymer with an alkylhydrazine of Formula 3

$R^1NHNH_2$  3 wherein $R^1$ is $C_1$–$C_3$ alkyl or benzyl.

This invention also provides a process for producing a carbonyl-containing product compound from a carbonyl-containing precursor selected from the group consisting of modifiable aldehydes and ketones which bind to an alkylhydrazine group having an $NH_2$ end group, at said end group. This process comprises (1) condensing the precursor with a polymer comprising alkylhydrazine-functionalized styrene units of Formula 1 to bind the carbonyl carbon to the nitrogen of the end group with a hydrazone linkage; (2) modifying the bound precursor; and (3) hydrolyzing the hydrazone linkage to provide the product compound.

This invention further provides a process for producing a cyano-containing product compound from an aldehyde precursor which binds to an alkylhydrazine group having an $NH_2$ end group, at said end group. This process comprises (i) condensing the precursor with a polymer comprising alkylhydrazine-functionalized styrene units of Formula 1 to bind the carbonyl carbon of said aldehyde to the nitrogen of said end group with a hydrazone linkage; and (ii) oxidizing the hydrazone linkage to cleave the end group from the polymer and to produce the product compound. The bound precursor of (i) may be modified prior to oxidation.

This invention still further provides a method of chemical synthesis including purification from impurity having electrophilic functionality (e.g., one or more compounds selected from aldehydes, ketones, acyl chlorides, sulfonyl chlorides and isocyanates). This process is characterized by scavenging said impurity with a polymer comprising alkylhydrazine-functionalized styrene units of Formula 1.

DETAILED DESCRIPTION OF THE INVENTION

The polymer resins of this invention contain styrene units which are functionalized with alkylhydrazine groups. These resins are useful for small molecule synthesis, particularly in combinatorial chemistry.

Resin is defined variously in the polymer arts (see M. S. M. Alger, *Polymer Science Dictionary*, Elsevier, N.Y., 1989, p. 415). In this disclosure, resin is synonymous with polymer. Styrene polymer, polymer comprising styrene units, polystyrene, polystyrene resin and styrene polymer resin are all synonymous. Functionalized styrene polymer, polymer comprising functionalized styrene units, functionalized polystyrene, functionalized polystyrene resin and functionalized styrene polymer resin are synonymous and refer to a composition of matter comprising polymer chains formed from units corresponding to a functionalized styrene monomer and optionally also other units corresponding to other monomers such as unfunctionalized styrene. As functionalized polystyrene is often made from unfunctionalized polystyrene and in the functionalization process not every unit is functionalized, functionalized polystyrene typically will comprise unfunctionalized as well as functionalized units. Functionalized polystyrene made from a mixture of functionalized and unfunctionalized styrene monomers will also comprise both functionalized and unfunctionalized units (for a description of copolymerization of chloromethylstyrene with a variety of other monomers, see J.-P. Montheard, M. Chatzopolous and M. Camps, "Functional Polymers via Free-Radical Polymerization of Chloromethylstyrene", in *Desk Reference of Functional Polymers, Syntheses and Applications*, R. Arshady, Ed., American Chemical Society, Washington, D.C. 1996, Chapter 1.1). In an alkylhydrazine-functionalized polystyrene of this invention, the unit corresponding to the functionalized styrene monomer is of Formula 1 as defined in the Summary of the Invention.

Preferred for reason of ease of synthesis, cost or high functional titer are:

Preferred 1. A polymer comprising units of Formula 1 wherein
  L is $L^1$;
  m is 1, and
  n is 0.
Preferred 2. A polymer of Preferred 1 wherein
  $R^1$ is $CH_3$.

Preferred 3. A polymer comprising units of Formula 1 wherein
  L is $L^1$;
  m is 1, and
  n is an integer from 4 to 25.
Preferred 4. A polymer of Preferred 3 wherein
  $R^1$ is $CH_3$.
Preferred 5. A polymer comprising units of Formula 1 wherein
  L is $L^2$; and
  p is an integer from 4 to 10.
Preferred 6. A polymer of Preferred 5 wherein
  $R^1$ is $CH_3$.

Particularly preferred for reason of high functional titer and low cost are:

Preferred 7. A polymer comprising units of Formula 1 or any of Preferreds 1–6 consisting essentially of a polystyrene backbone which is cross-linked with about 0.5 to 20% by weight divinylbenzene units.
Preferred 8. A polymer of Preferred 7 which is cross-linked with about 0.8–8% by weight divinylbenzene units.
Preferred 9. A polymer of Preferred 8 which is cross-linked with about 1–2% by weight divinylbenzene units.

The polymer chains in an alkylhydrazine-functionalized polystyrene of this invention preferably also comprise about 0.5 to about 20% by weight units corresponding to the divinylbenzene monomer to provide cross-linking so as to improve the physical strength and resistance to solvents of the derived resin. About 0.8 to 8% by weight divinylbenzene units is preferred. Most preferred is about 1 to 2% by weight divinylbenzene units, which provides resins with very good physical properties. The polystyrene chains optionally also comprise units derived from vinylethylbenzene and other substituted vinyl benzenes (as described for ion exchange resins by F. W. Billmeyer, Jr., *Textbook of Polymer Science*, Second Edition, Wiley-Interscience, New York, 1971, p. 407). Furthermore the polystyrene chains are optionally grafted onto other carbonaceous polymeric backbones such as polyethylene, polypropylene or fluoropolymers, as is well known in the art.

For reason of cost and obtaining greatest titer per weight of polymer, a preferred alkylhydrazine-functionalized polystyrene resin of the invention is not grafted onto other carbonaceous polymeric backbones, but simply comprises polystyrene chains cross-linked with units derived from divinylbenzene as described and wherein at least 1%, preferably at least 10%, of the styrene units are of Formula I and the remainder of the styrene units are unfunctionalized. Said preferred resin is referred to as consisting essentially of a polystyrene backbone.

An alkylhydrazine-functionalized styrene polymer of the invention is usually prepared and used in the form of small microporous or macroporous beads, having average particle diameters typically ranging from about 50 to about 500 μm, although larger or smaller sizes are possible. Functionalized styrene polymers serving as precursors are commercially available in the form of such beads, conveniently prepared by suspension polymerization (see E. C. Blossey and W. T. Ford, "Polymeric Reagents" in *Comprehensive Polymer Chemistry*, Vol. 6, G. Allen et al. Ed., Pergamon Press, New York, 1989, pp. 81–114, F. W. Billmeyer, Jr., *Textbook of Polymer Science*, Second Edition, Wiley-Interscience, New York, 1971, pp. 358–359, 407).

The alkylhydrazine-functionalized polystyrene resins of this invention are prepared by the method outlined in Scheme 1 where $L^3$ and $R^1$ are as defined in the Summary of the Invention, and X is a leaving group useful in nucleophilic displacement reactions. Such leaving groups include, for example, Cl, Br, I, $OS(O)_2CH_3$ and $OS(O)_2Ph$-4-$CH_3$.

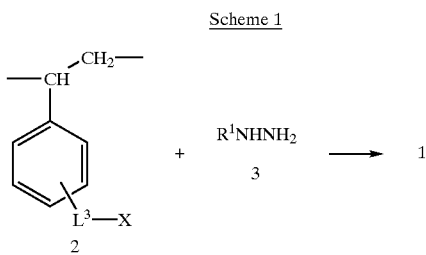

A polymer comprising halo-functionalized styrene units of Formula 2 is mixed with 1 to 100 equivalents of an alkylhydrazine of Formula 3 in the presence of a solvent which promotes swelling of the resin, such as methylene chloride, tetrahydrofuran, dioxane or toluene, as known to one skilled in the art. The mixture is agitated for 1 to 96 hours at 0 to 120° C., returned to ambient temperature, and 1 to 100 equivalents of a tertiary amine base such as N,N-diisopropylethylamine or triethylamine is added with the mixture being stirred 1–10 hours. The resin is filtered and thoroughly washed with fresh solvents by repeated re-suspension and filtering as known to one skilled in the art and dried in vacuo to provide the hydrazine functionalized resin comprising units of Formula 1. Among the most suitable solvents for washing the resin are chlorinated hydrocarbons such as methylene chloride, chloroform or 1,1-dichloroethane, which are able to dissolve the byproduct tertiary amine hydrohalide or hydrosulfonate.

Polymers comprising halo-functionalized styrene units of Formula 2 (where X is a halogen) are known in the art (see, for example, Merrifield et al., *Tetrahedron Lett.* 1976, 42, 3795–3798; and Mathur et al. "Polymers as Aids in Organic Synthesis", Academic Press, New York, 1980), and many are commercially available (for example, chloromethylated polystyrene cross-linked with divinylbenzene is available from suppliers such as Aldrich Chemical Company; polyethylene glycol, with a terminal bromoethyl functionality, grafted onto polystyrene backbone 1% cross-linked with divinylbenzene is available from Advanced ChemTech, Inc.; bis(polyethylene glycol), with a terminal chloroethyl functionality, grafted onto a polystyrene backbone 1–2% cross-linked with divinylbenzene is available from Argonaut Technologies; chloromethylated polystyrene grafted polyethylene SynPhase™ crowns are available from Chiron Technologies; and chloromethylated polystyrene grafted polypropylene MicroTube™ reactors are available from Irori Quantum Microchemistry). Polymers comprising sulfonate-functionalized styrene units of Formula 2 (where X is, for example, $OS(O)_2CH_3$ or $OS(O)_2Ph$-4-$CH_3$) are known in the art or can be easily prepared by reaction of the corresponding polymer supported alcohol with a sulfonyl chloride (see for example, Richter et al., *Tetrahedron Lett.* 1997, 38(3), 321–322; and Jiang, L. et al. *J. Chem. Soc., Chem. Comm.* 1996, 18, 2193–2194). Alkyl hydrazines of Formula 3 are either commercially available or readily prepared by known methods.

The quality of the hydrazine functionalized resins prepared by the above method can be determined by elemental analysis of a suitable derivative as shown in Scheme 2. For example, 1% cross-linked 1-methylhydrazine-functionalized poly(styrene-co-divinylbenzene) comprising units of Formula 1a (Formula 1 where L is $CH_2$ and $R^1$ is $CH_3$) is treated with excess 4-bromobenzaldehyde to give, after filtration, thorough washing and drying in vacuo, the derivatized resin comprising units of Formula 4. The nitrogen and bromine content, as determined by microanalysis, gives the loading level of the resin and allows one to calculate the number of equivalents of active $NH_2$ groups per gram of the Formula 1a resin. Analysis by this method shows that resins such as the Formula 1a resin have near theoretical levels of active $NH_2$ groups and that only minor loss of active $NH_2$ groups occur over storage in closed vessels at room temperature.

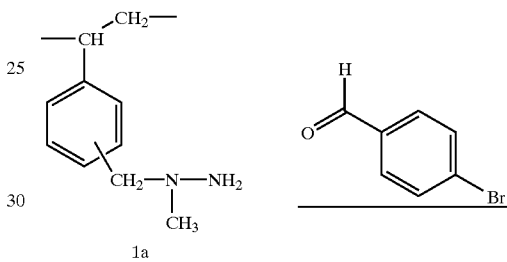

UTILITY

The alkylhydrazine-functionalized polystyrene resins of this invention have high active $NH_2$ titers, making them useful as solid supports to aid organic synthetic methods such as for small molecule synthesis and as supported nucleophiles to aid purification of solution phase reactions. They are especially useful in facilitating combinatorial, parallel, and high throughput automated synthesis of compound libraries via both solid phase and solution phase approaches.

In solid phase synthesis, these resins serve the purposes outlined in Scheme 3. They provide a reactive hydrazine functionality for condensation with an organic substrate containing an aldehyde or ketone 5a to afford a hydrazone linkage to the resin.

Scheme 3

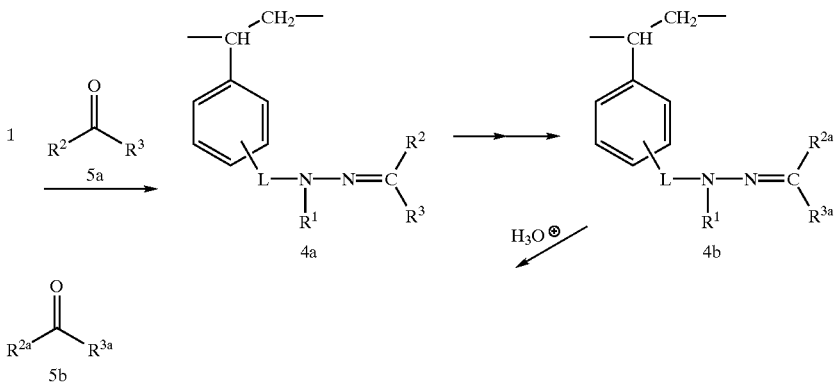

In Scheme 3, R² can be an alkyl or aryl group and R³ can be hydrogen, alkyl or aryl. Appropriate solvents for the condensations include aromatic hydrocarbons such as benzene or toluene, ethereal solvents such as tetrahydrofuran or dioxane, polar aprotic solvents such as acetonitrile or N,N-dimethylformamide, and haloalkanes such as methylene chloride or dichloroethane. The condensations are run at temperatures ranging between 0 and 120° C., and optionally an acid catalyst such as 4-toluenesulfonic acid or hydrochloric acid can be added. The condensations can also be promoted by removal of water via azeotropic distillation of the reaction solvent.

The resin-linked hydrazones 4a can then undergo one or more reactions to modify the substrate as desired at remote functionalities of the substrate to afford a modified hydrazone-linked resin 4b in which one or both of $R^{2a}$ and $R^{3a}$ have been chemically modified from $R^2$ and $R^3$, respectively, of 4a. In Scheme 3, $R^{2a}$ can be an alkyl or aryl group and $R^{3a}$ can be hydrogen, alkyl or aryl.

After such chemical modifications, the hydrazone linkage can be hydrolyzed regenerating an aldehyde or ketone 5b which is chemically modified from 5a. Hydrolysis is typically carried out in the presence of water with a miscible co-solvent such as tetrahydrofuran or dioxane that promotes swelling of the resin. An acid catalyst such as 4-toluenesulfonic acid or hydrochloric acid is also needed to carry out the hydrolysis. Temperatures for the hydrolysis can range between 0 and 120° C.

Alternatively, when $R^3$ and $R^{3a}$ in Scheme 3 are hydrogen, instead of hydrolyzing the the hydrazone linkage, it can be oxidized to release a product 6 containing a cyano group, as shown in Scheme 4.

Scheme 4

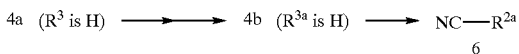

A number of useful oxidants can effect this transformation. Among these are dimethyldioxirane (DMDO) in acetone solvent, peracids such as m-chloroperbenzoic acid or peracetic acid in haloalkane solvents such as methylene chloride, hydrogen peroxide in methanol or acetic acid optionally with a metal catalyst such as methyltrioxorhenium, and alkyl peroxides such as t-butyl hydroperoxide with a metal catalyst such as vanadium bis(acetoacetate). The resin byproduct from the oxidation reactions is filtered and thoroughly washed with fresh solvents by repeated re-suspension and filtering as known to one skilled in the art. Concentration of the filtrate affords the product containing the cyano group. Purification of the product can be achieved by methods known to one skilled in the art.

In solution phase synthesis, these resins can be used to simplify work-up and purification procedures by acting as scavengers of excess reagents or byproducts. Examples of compounds that can be scavenged by these resins include not only compounds such as aldehydes and ketones which are capable of forming hydrazones but also other compounds which have electrophilic functionality, such as acyl chlorides, sulfonyl chlorides and isocyanates. The use of scavenger resins in solution phase synthesis has been described by Kaldor et al., *Tetrahedron Lett.* 1996, 37, 7193–7196; and Booth and Hodges, *J. Am. Chem. Soc.* 1997, 119, 4882–4886.

The invention is further illustrated by the following examples.

EXAMPLE 1

Preparation of 1% Cross-linked 1-(1-methylhydrazino)methyl Functionalized poly(styrene-co-divinylbenzene) Comprising Units of Formula 1a Methylhydrazine (5 mL) was added to a suspension of beads of chloromethyl-polystyrene, 1% divinylbenzene-crosslinked (Advanced ChemTech; 100–200 mesh (75–150 μm), 10.0 g, 0.94 meq/g) in tetrahydrofuran (200 mL), and the mixture was heated at reflux for 24 h. N,N-Diisopropylethylamine (5 mL) was added, and the mixture was stirred 4 h at ambient temperature. The resin product was filtered from the reaction mixture and washed repeatedly with methylene chloride using volumes sufficient to create a suspension of the solid material. The resin solids were dried in vacuo to afford the title resin as a free-flowing yellow powder. IR (KBr) 3450 (broad) cm$^{-1}$; $^{13}$C NMR (C$_6$D$_6$) δ41, 48.6, 68.4, 128, 146.

EXAMPLE 2

Preparation of 1% Cross-linked [[2-[(4-bromophenyl)methylene]-1-methylhydrazino]methyl] Functionalized poly(styrene-co-divinylbenzene)

4-Bromobenzaldehyde (4.2 g) was added to a suspension of the product resin of Example 1 (5.0 g) in benzene (100 mL), and the mixture was stirred at ambient temperature for 2 d. The resin product was filtered from the reaction mixture and washed repeatedly with methylene chloride using volumes sufficient to create a suspension of the solid material. The resin solids were dried in vacuo to afford the title resin as a free-flowing yellow powder. $^{13}$C NMR (C$_6$D$_6$) δ41, 48.6, 68.4, 128, 146.

EXAMPLE 3

Preparation of 4-bromobenzonitrile

The product resin of Example 2 (1.0 g) was suspended in an acetone solution of dimethyldioxirane (see W. Adam et al., *J Org. Chem.* 1987, 52, 2800–2803; 0.1 mM, 20 mL) and stirred at ambient temperature for 1 h. Solids were filtered and rinsed repeatedly with methylene chloride. The filtrate was evaporated to leave the title compound as a white solid (95 mg). IR (CH$_2$Cl$_2$) 2220 cm$^{-1}$; $^1$H NMR (CDCl$_3$)δ7.5 (d, J=6 Hz, 2H),7.6(d,J=6 Hz, 2H), identical to an authentic commercial sample.

EXAMPLE 4

Preparation of 1% Cross-linked [[2-([1,1 '-biphenyl]-4-ylmethylene)- 1 -methylhydrazino]-methyl] Functionalized poly(styrene-co-divinylbenzene and Conversion to 4-phenylbenzonitrile The product resin of Example 2 (1.0 g) was suspended in dimethoxyethane (20 mL) solution containing palladium acetate (21 mg, 0.094 mmol) and 1,1'-bis(diphenylphosphinoferrocene) (104 mg, 0.19 mmol). The mixture was stirred for 10 min while N$_2$ was bubbled through. A solution of sodium carbonate (300 mg) in water (1 mL) was added, and N$_2$ was bubbled through for 2 h. Phenylboronic acid (300 mg, 2.5 mmol) was added, and the mixture was heated at reflux for 16 h. Solids were isolated by filtration and rinsed repeatedly with methylene chloride before being dried in vacuo to give the title polymer. To verify the composition of the title polymer, 100 mg was suspended in an acetone solution of dimethyldioxirane (1.0 N, 10.0 mL) and stirred at ambient temperature for 4 h. The solids ere removed by filtration and rinsed with methylene chloride. The filtrate was evaporated to leave 4-phenylbenzonitrile as a white solid (5 mg). $^1$H NMR (CDCl$_3$) δ7.5–7.5 (m, 3H), 7.6 (d, J=6 Hz, 2H), 7.7 (m, 4H), identical to a commercial sample of 4-phenylbenzonitrile.

EXAMPLE 5

Preparation of 1% Cross-linked 1-(1-methylhydrazino)ethyl Functionalized polyethylene glycol Grafted onto poly(styrene-co-divinylbenzene)

Methylhydrazine (5 mL) is added to a suspension of beads of polyethylene glycol with a terminal bromoethyl functionality and grafted onto polystyrene backbone 1% cross-linked with divinylbenzene (TentaGel® S Br from Advanced ChemTech; 130 μm particle size, 10.0 g) in tetrahydrofuran (200 mL), and the mixture is heated at reflux for 24 h. N,N-Diisopropylethylamine (5 mL) is added, and the mixture is stirred 4 h at ambient temperature. The title resin product is isolated by filtration from the reaction mixture, washed repeatedly with methylene chloride and dried in vacuo.

EXAMPLE 6

Preparation of 1% Cross-linked (1-methylhydrazino)methyl Functionalized bis (polyethylene glycol Grafted onto a polystyrene Backbone 1–2% Cross-linked with divinylbenzene Methanesulfonyl chloride (5.0 mL) is added dropwise to a stirred suspension of beads of bis(polyethylene glycol) with a terminal hydroxyethyl functionality, grafted onto polystyrene backbone 1% cross-linked with divinylbenzene (Argonaut Technologies; 120–230 μm particle size, 10.0 g) in. methylene chloride (100 mL) containing N,N-diisopropylethylamine (30 mL) at 0 ° C. After warming to ambient temperature and stirring 1 h, the resin is filtered, rinsed repeatedly with methylene chloride and dried in vacuo. The dried resin is suspended in tetrahydrofuran (200 mL), and methylhydrazine (5 mL) is added. The mixture is heated at reflux for 24 h. N,N-Diisopropylethylamine (10 mL) is added, and the mixture is stirred 4 h at ambient temperature. The title resin product is filtered from the reaction mixture, washed repeatedly with methylene chloride and dried in vacuo.

EXAMPLE 7

Preparation of 1% Cross-linked [[[[(5-hydroxymethyl)-2-furanyl]methylene]methyl] hydrazino]methyl Functionalized poly(styrene-co-divinylbenzene)

5-(Hydroxymethyl)-2-furancarboxaldehyde (5.0 g) was added to a suspension of the product resin of Example 1 (5.0 g) in a mixture of benzene and dichloromethane (1:1, 50 mL), and the resulting mixture was stirred at ambient temperature for 2 days. The resin product was then filtered from the reaction mixture and rinsed repeatedly with dichloromethane. The resin solids were dried in vacuo to afford the title resin as a free-flowing off-white powder.

To confirm the incorporation of the furan on the resin, a sample (200 mg) of the resin was treated with sodium hydrogen carbonate (200 mg) and Oxone® potassium peroxymonosulfate (400 mg) in a mixture of acetone and water (3:1, 20 mL) for 20 hours. The solids were then filtered and washed well with water and ethyl acetate. The ethyl acetate phase was separated and dried (MgSO$_4$). Evaporation of the solvent left an oil (12 mg) having a NMR spectrum consistent with 5-(hydroxymethyl)-2-furancarbonitrile. $^1$H NMR (CDCl$_3$) δ2.5 (br s, 1H), 4.6 (s, 2H), 6.4 (d, J=2 Hz, 1H), 7.0 (d, J=2 Hz, 1H)

EXAMPLE 8

Preparation of 1% Cross-linked [[[[5-[(2-propenyloxy)methyl]-2-furanyl]methylene] methylhydrazino]methyl] Functionalized poly (styrene-co-divinylbenzene)

The resin of Example 7 (200 mg) was suspended in dry tetrahydrofuran (10 mL). Potassium tert-butoxide (112 mg, 1.0 mmol) was added. After stirring 5 minutes, allyl iodide (0.14 mL, 1.5 mmol) was added, and the mixture was stirred at room temperature over night. The solids were then filtered, washed with water, N,N-dimethylformamide and dichloromethane (3x), and then dried in vacuo.

To determine completion of the reaction, a sample of the resin (100 mg) was treated with sodium hydrogen carbonate (100 mg) and Oxone® potassium peroxymonosulfate (200 mg) in a mixture of acetone and water (3:1, 10 mL) for 20 hours. The solids were then filtered and washed with water and ethyl ether. The ether phase was separated and dried (MgSO$_4$). Evaporation of the solvent left an oil (5 mg) having a NMR spectrum consistent with 5-[(2-propenyloxy) methyl]-2-furancarbonitrile. $^1$H NMR (CDCl$_3$) δ4.0 (d, J=3 Hz, 2H), 4.4 (s, 2H), 5.2 (m, 2H), 5.8 (m, 1H), 6.5 (d, J=2 Hz, 1H), 7.0 (d, J=2 Hz, 1H).

By the procedures described herein together with methods known in the art, the following polymer resins of Table 1 can be prepared.

TABLE 1

Styrene polymers comprising units of:

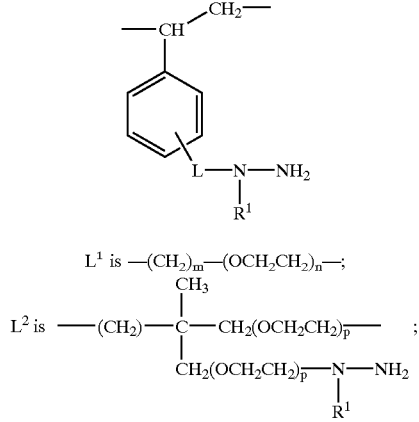

$L^1$ is $-(CH_2)_m-(OCH_2CH_2)_n-$;

$L^2$ is $-(CH_2)-\underset{\underset{CH_2(OCH_2CH_2)_{\overline{p}}-N-NH_2}{|}}{\overset{\overset{CH_3}{|}}{C}}-CH_2(OCH_2CH_2)_{\overline{p}}-$ ;

| Styrene Polymer | L | m | $R^1$ |
|---|---|---|---|
| A | $L^1$ | 1 | $CH_3$ |
| A | $L^1$ | 1 | $CH_2CH_3$ |
| A | $L^1$ | 1 | $CH_2CH_2CH_3$ |
| A | $L^1$ | 1 | $CH_2$-phenyl |
| A | $L^1$ | 2 | $CH_3$ |
| A | $L^1$ | 2 | $CH_2CH_3$ |
| A | $L^1$ | 2 | $CH_2CH_2CH_3$ |
| A | $L^1$ | 2 | $CH_2$-phenyl |
| A | $L^1$ | 3 | $CH_3$ |
| A | $L^1$ | 3 | $CH_2CH_3$ |
| A | $L^1$ | 3 | $CH_2CH_2CH_3$ |
| A | $L^1$ | 3 | $CH_2$-phenyl |
| B | $L^1$ | 1 | $CH_3$ |
| B | $L^1$ | 1 | $CH_2CH_3$ |
| B | $L^1$ | 1 | $CH_2CH_2CH_3$ |
| B | $L^1$ | 1 | $CH_2$-phenyl |
| B | $L^1$ | 2 | $CH_3$ |
| B | $L^1$ | 2 | $CH_2CH_3$ |
| B | $L^1$ | 2 | $CH_2CH_2CH_3$ |
| B | $L^1$ | 2 | $CH_2$-phenyl |
| B | $L^1$ | 3 | $CH_3$ |
| B | $L^1$ | 3 | $CH_2CH_3$ |
| B | $L^1$ | 3 | $CH_2CH_2CH_3$ |
| B | $L^1$ | 3 | $CH_2$-phenyl |
| C | $L^1$ | 1 | $CH_3$ |
| C | $L^1$ | 1 | $CH_2CH_3$ |
| C | $L^1$ | 1 | $CH_2CH_2CH_3$ |
| C | $L^1$ | 1 | $CH_2$-phenyl |
| D | $L^1$ | 1 | $CH_3$ |
| D | $L^1$ | 1 | $CH_2CH_3$ |
| D | $L^1$ | 1 | $CH_2CH_2CH_3$ |
| D | $L^1$ | 1 | $CH_2$-phenyl |
| E | $L^1$ | 1 | $CH_3$ |
| E | $L^1$ | 1 | $CH_2CH_3$ |
| E | $L^1$ | 1 | $CH_2CH_2CH_3$ |
| E | $L^1$ | 1 | $CH_2$-phenyl |
| F | $L^1$ | 1 | $CH_3$ |
| F | $L^1$ | 1 | $CH_2CH_3$ |
| F | $L^1$ | 1 | $CH_2CH_2CH_3$ |
| F | $L^1$ | 1 | $CH_2$-phenyl |
| G | $L^2$ | — | $CH_3$ |
| G | $L^2$ | — | $CH_2CH_3$ |
| G | $L^2$ | — | $CH_2CH_2CH_3$ |
| G | $L^2$ | — | $CH_2$-phenyl |
| H | $L^1$ | 1 | $CH_3$ |
| H | $L^1$ | 1 | $CH_2CH_3$ |

TABLE 1-continued

Styrene polymers comprising units of:

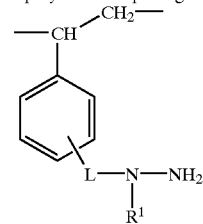

$L^1$ is $-(CH_2)_m-(OCH_2CH_2)_n-$;

$L^2$ is $-(CH_2)-\underset{\underset{CH_2(OCH_2CH_2)_{\overline{p}}-N-NH_2}{|}}{\overset{\overset{CH_3}{|}}{C}}-CH_2(OCH_2CH_2)_{\overline{p}}-$ ;

| Styrene Polymer | L | m | $R^1$ |
|---|---|---|---|
| H | $L^1$ | 1 | $CH_2CH_2CH_3$ |
| H | $L^1$ | 1 | $CH_2$-phenyl |

A is 1% cross-linked poly(styrene-co-divinylbenzene). n is 0.
B is 2% cross-linked poly(styrene-co-divinylbenzene). n is 0.
C is 4% cross-linked poly(styrene-co-divinylbenzene). n is 0.
D is 8% cross-linked poly(styrene-co-divinylbenzene). n is 0.
E is considered an equivalent of Chiron Technologies' polystyrene grafted polyethylene SynPhase ™ crowns. n is 0.
F is considered an equivalent of Irori Quantum Microchemistry's polystyrene grafted polypropylene MicroTube ™ reactors. n is 0.
G is considered an equivalent of Argonaut Technologies' (bis)-polyethylene glycol grafted polystyrene ArgoGel ™ resin. p is an integer in the range of 4 to 10.
H is considered an equivalent of Advanced ChemTech's polyethylene glycol grafted polystyrene TentaGel ® S Resin. n is an integer in the range of 4 to 25.

What is claimed is:

1. A polymer comprising alkylhydrazine-functionalized styrene units of Formula 1

$$\underset{\underset{R^1}{|}}{\overset{CH_2-}{\underset{CH}{\bigcirc}}}L-N-NH_2 \quad 1$$

wherein

L is $L^1$ or $L^2$;

$L^1$ is $-(CH_2)_{\overline{m}}-(OCH_2CH_2)_{\overline{n}}-$;

$L^2$ is $-(CH_2)-\underset{\underset{CH_2(OCH_2CH_2)_{\overline{p}}-N-NH_2}{|}}{\overset{\overset{CH_3}{|}}{C}}-CH_2(OCH_2CH_2)_{\overline{p}}-$ m is an integer from 1 to 3;
n is an integer from 0 to 50;
p is an integer from 1 to 25; and
$R^1$ is $C_1$–$C_3$ alkyl or benzyl.

2. A polymer of claim 1 wherein
L is $L^1$;
m is 1; and
n is 0.

3. A polymer of claim 2 wherein $R^1$ is $CH_3$.

4. A polymer of claim 1 wherein
L is $L^1$;
m is 1; and
n is an integer from 4 to 25.

5. A polymer of claim 4 wherein $R^1$ is $CH_3$.

6. A polymer of claim 1 wherein
L is $L^2$; and
p is an integer from 4 to 10.

7. A polymer of claim 6 wherein $R^1$ is $CH_3$.

8. A bead comprising the polymer of claim 1.

9. A process for preparing the polymer of claim 1, the process comprising the steps of:

(a) treating a polymer comprising functionalized styrene units of Formula 2

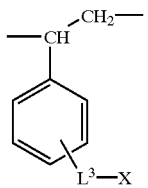

2 wherein $L^3$ is   $—(CH_2)_{\overline{m}}—(OCH_2CH_2)_{\overline{n}}—$   or

-continued

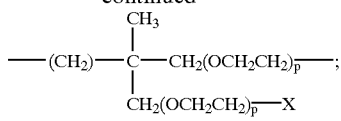

m is an integer from 1 to 3;
n is an integer from 0 to 50;
p is an integer from 1 to 25; and
X is a leaving group;

with a solvent suitable to swell said polymer; and (b) reacting the solvent-treated polymer with an alkylhydrazine of Formula 3

$$R^1NHNH_2 \qquad\qquad 3$$

wherein $R^1$ is $C_1$–$C_3$ alkyl or benzyl.

10. A polymer of claim 1 or claim 3 wherein the polymer backbone consists essentially of polystyrene which is cross-linked with about 1% divinylbenzene units.

11. A polymer of claim 1 wherein L is $L^1$.

12. A polymer of claim 1 wherein m is 1.

13. A polymer of claim 1 wherein $R^1$ is $CH_3$.

14. A polymer of claim 1 wherein n is 0.

15. A polymer of claim 1 wherein the polymer backbone consists essentially of polystyrene which is cross-linked with from about 0.5 to 20% by weight divinylbenzene units.

16. A polymer of claim 15 wherein the polystyrene is cross-linked with from about 0.8 to 8% by weight divinylbenzene units.

17. A polymer of claim 16 wherein the polystyrene is cross-linked with from about 1 to 2% by weight divinylbenzene units.

* * * * *